US009304188B2

(12) United States Patent
Jang et al.

(10) Patent No.: US 9,304,188 B2
(45) Date of Patent: Apr. 5, 2016

(54) APPARATUS AND METHOD FOR DETERMINING LOCATION OF TERMINAL

(71) Applicant: Electronics and Telecommunications Research Institute, Daejeon (KR)

(72) Inventors: Il-Soon Jang, Daejeon (KR); Sang-Kyu Lim, Daejeon (KR); Myung-Soon Kim, Daejeon (KR); Jin-Doo Jeong, Daejeon (KR); Tae-Gyu Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/621,803

(22) Filed: Feb. 13, 2015

(65) Prior Publication Data
US 2015/0226835 A1 Aug. 13, 2015

(30) Foreign Application Priority Data

Feb. 13, 2014 (KR) ........................ 10-2014-0016601

(51) Int. Cl.
*G01B 11/14* (2006.01)
*G01S 5/16* (2006.01)
*G01S 1/70* (2006.01)
(52) U.S. Cl.
CPC ...... *G01S 5/16* (2013.01); *G01S 1/70* (2013.01)
(58) Field of Classification Search
CPC ........... G01S 5/16; G01S 5/163; G01S 11/12; H04Q 7/20
USPC ........ 356/614–623; 250/221, 222.1; 455/456; 342/357.1; 725/62, 14, 124
See application file for complete search history.

(56) References Cited

U.S. PATENT DOCUMENTS

| 8,265,635 | B2 * | 9/2012 | Morisaki | G01S 5/14 455/446 |
| 2002/0132624 | A1 * | 9/2002 | Watanabe | G01S 5/14 455/456.1 |
| 2005/0204379 | A1 * | 9/2005 | Yamamori | H04N 21/6582 725/15 |
| 2007/0050824 | A1 * | 3/2007 | Lee | G01S 5/0252 725/81 |
| 2012/0154824 | A1 | 6/2012 | Kim et al. | |
| 2013/0279760 | A1 * | 10/2013 | Lee | G01S 5/16 382/106 |
| 2014/0110571 | A1 * | 4/2014 | Kim | G01V 8/10 250/221 |
| 2015/0042449 | A1 * | 2/2015 | Suh | G07C 9/00111 340/5.7 |

FOREIGN PATENT DOCUMENTS

KR      101263394 A      5/2013

* cited by examiner

*Primary Examiner* — Hoa Pham
(74) *Attorney, Agent, or Firm* — William Park & Associates Ltd.

(57) ABSTRACT

An apparatus and method for determining the location of a terminal are disclosed herein. The apparatus includes a reception unit, an initiation unit, a selection unit, and a correction unit. The reception unit receives the location identifications (IDs) of one or more illumination lights. The initiation unit initiates the location coordinates of a receiving terminal to the coordinates of an illumination light corresponding to the most frequently received location identification (ID). The selection unit selects the coordinates of an illumination light corresponding to the second-most frequently received location ID. The correction unit calculates the reception ratio of reception from the coordinates of the initiated illumination light to reception from the coordinates of the selected illumination light, and then corrects the coordinates of the receiving terminal based on the calculated reception ratio.

10 Claims, 6 Drawing Sheets

APPARATUS AND METHOD FOR DETERMINING LOCATION OF TERMINAL

CROSS-REFERENCE TO RELATED APPLICATION

This application claims the benefit of Korean Patent Application No. 10-2014-0016601, filed Feb. 13, 2014, which is hereby incorporated by reference herein in its entirety.

BACKGROUND

1. Technical Field

Embodiments of the present invention relate to an apparatus and method for determining the location of a terminal and, more particularly, to an apparatus and method for determining the location of a terminal that simultaneously receives at least two pieces of location information in visible light communication (VLC) using LED illumination lights that transmit location information.

2. Description of the Related Art

Visible light is light having a wavelength in the range visible to the human eye among electromagnetic waves. The wavelength ranges from 380 to 780 nm. In visible light, a variation in characteristics attributable to a difference in wavelength is exhibited in the form of color, and the wavelength decreases across the spectrum from red to violet. Light having a wavelength longer than that of red color is referred to as infrared light, and light having a wavelength shorter than that of violet is referred to as ultraviolet light. In the case of monochromatic light, 700~610 nm corresponds to red, 610~590 nm corresponds to orange, 590~570 nm corresponds to yellow, 570~500 nm corresponds to green, 500~450 nm corresponds to blue, and 450~400 nm corresponds to violet. A variety of colors can be represented by mixing colors having these wavelengths.

Visible light is visible to humans, unlike infrared light or ultraviolet light. Illumination which emits visible light should satisfy a variety of requirements such as accurate color representation. One of these requirements is little flickering. Since humans cannot perceive 200 or more flickers per second, illumination apparatuses using Light Emitting Diodes (LEDs) having fast flicker performance control flickering using Pulse Width Modulation (PWM) in order to increase the lifespan thereof and save energy.

VLC is a wireless communication technology using a wavelength in the visible range from 380 to 780 nm. Although VLC is similar to infrared communication, they are different in the wavelength range used. Communication technology using light in the communication range includes Infrared Data Association (IrDA) using the infrared range, VLC using visible light, and optical communication using optical fiber.

Although the Infrared Data Association (IrDA) is a non-governmental standard organization that was found in 1993 to establish standards for infrared data communications, IrDA also refers to the communication standards established by the IrDA. Principal standards for PC personal computers include IrDA1.0 for a maximum data transmission speed ranging from 2.4 to 115.2 kbps and IrDA1.1 for maximum data transmission speeds of 1.152 Mbps and 4 Mbps. IrDA is technology for performing communication using a wavelength in the infrared range from 850 to 900 nm.

VLC is a wireless communication technology using a wavelength in the range of 380 nm to 780 nm. The visible light communication standardization process is being conducted within the IEEE 802.15 Wireless Personal Area Network (WPAN) Working Group. In Korea, the Telecommunications Technology Association (TTA) is operating a visible light communication working group.

In general, a method of determining a location of a receiving terminal using VLC is based on a method of transferring different identifications (IDs) for respective illumination lights, as illustrated in FIG. 1, and determines that a receiving terminal is placed at a location where an illumination light is placed when an identification (ID) transmitted by the corresponding illumination light is received.

For example, U.S. Patent Application Publication No. 2012-0154824 entitled "Position Measuring Apparatus and Method" discloses a technology for measuring a position based on information provided by at least one communication device including a transmission light source.

Although technology for determining the location of a terminal using VLC has been actively researched as described above, there is still a need for a technology for determining the location of a terminal more accurately than a technology for receiving location information from a plurality of illumination lights.

SUMMARY

Embodiments of the present invention are directed to the provision of an apparatus and method for determining the location of a terminal that simultaneously receives at least two pieces of location information in visible light communication (VLC) using LED illumination lights that transmit location information.

In accordance with an aspect of the present invention, there is provided a method of determining the location of a terminal, including receiving the location IDs of one or more illumination lights; initiating the location coordinates of a receiving terminal to the coordinates of an illumination light corresponding to the most frequently received location ID; selecting the coordinates of an illumination light corresponding to the second-most frequently received location ID; and calculating the reception ratio of reception from the coordinates of the initiated illumination light to reception from the coordinates of the selected illumination light, and correcting the coordinates of the receiving terminal based on the calculated reception ratio.

Receiving the location IDs may include initializing a timer; receiving corresponding location IDs from one or more illumination lights during a set time period; and then terminating the timer.

The method may further include selecting coordinates of an illumination light corresponding to a third-most frequently received location ID, and correcting the coordinates of the receiving terminal based on the reception ratio of reception from the corrected coordinates of the receiving terminal to reception from the coordinates of the illumination light corresponding to the third-most frequently received location ID.

In accordance with another aspect of the present invention, there is provided an apparatus for determining the location of a terminal, including a reception unit configured to receive the location IDs of one or more illumination lights; an initiation unit configured to initiate the location coordinates of a receiving terminal to the coordinates of an illumination light corresponding to the most frequently received location ID; a selection unit configured to select the coordinates of an illumination light corresponding to the second-most frequently received location ID; and a correction unit configured to calculate the reception ratio of reception from the coordinates of the initiated illumination light to reception from the coordinates of the selected illumination light and then correct the coordinates of the receiving terminal based on the calculated reception ratio.

The reception unit may further configured to initialize a timer, to receive corresponding location IDs from one or more illumination lights during a set time period, and to then terminate the timer.

The correction unit may be further configured to select the coordinates of an illumination light corresponding to a third-most frequently received location ID, and to correct the coordinates of the receiving terminal based on the reception ratio of reception from the corrected coordinates of the receiving terminal to reception from the coordinates of the illumination light corresponding to the third-most frequently received location ID.

The apparatus may further include a storage unit configured to store the location IDs of the illumination lights that are received by the reception unit.

In accordance with still another aspect of the present invention, there is provided a method of determining the location of a terminal, including receiving the location IDs of one or more illumination lights; initiating the location coordinates of a receiving terminal and selecting the coordinates of an illumination light, based on the frequencies of reception of the received location IDs; and calculating the reception ratio of reception from the coordinates of the initiated illumination light to reception from the coordinates of the selected illumination light, and correcting the coordinates of the receiving terminal based on the calculated reception ratio.

Initiating the location coordinates of the receiving terminal may include initiating the location coordinates of the receiving terminal to the coordinates of an illumination light corresponding to the most frequently received location ID, and selecting the coordinates of the illumination light may include selecting the coordinates of an illumination light corresponding to the second-most frequently received location ID.

The method may further include storing the received location IDs of the illumination lights that are received by the reception unit.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
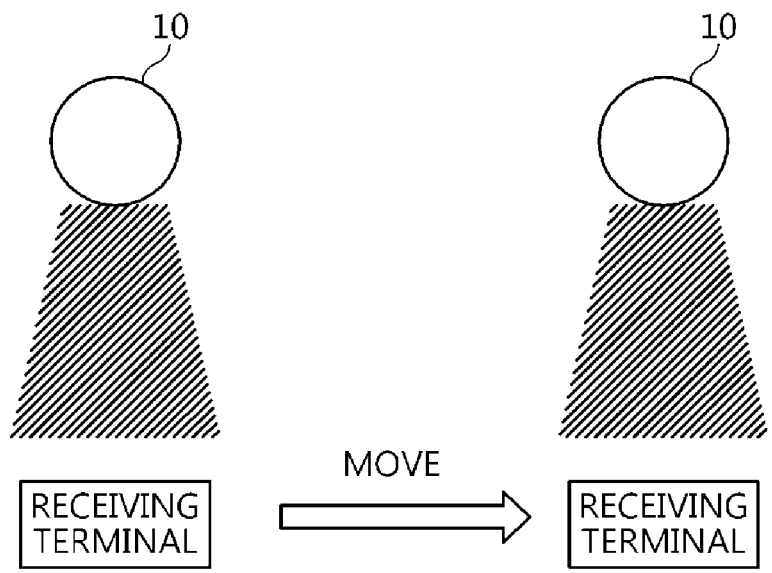
FIG. 1 is a diagram illustrating a conventional method of determining a location using VLC.

Embodiments of the present invention will be described in detail below with reference to the accompanying drawings.

Repeated descriptions and descriptions of well-known functions and configurations that have been deemed to make the gist of the present invention unnecessarily obscure will be omitted below. The embodiments of the present invention are intended to fully describe the present invention to persons having ordinary knowledge in the art to which the present invention pertains. Accordingly, the shapes, sizes, etc. of components in the drawings may be exaggerated to make the description obvious.

An apparatus and method for determining the location of a terminal according to embodiments of the present invention are described in detail with reference to the accompanying drawings.

FIG. 1 is a diagram illustrating a conventional method of determining a location using VLC.

Referring to FIG. 1, a first illumination light 10 and a second illumination light 20 transfer respective different IDs to a receiving terminal.

The receiving terminal determines that it is placed at a location where a specific illumination light is placed when receiving an ID from the corresponding illumination light.

For example, the receiving terminal may receive an ID from the first illumination light 10 and then determine that a current location is A, and may move, receive an ID from the second illumination light 20 and then determine that a current location is B.

Figure 2:
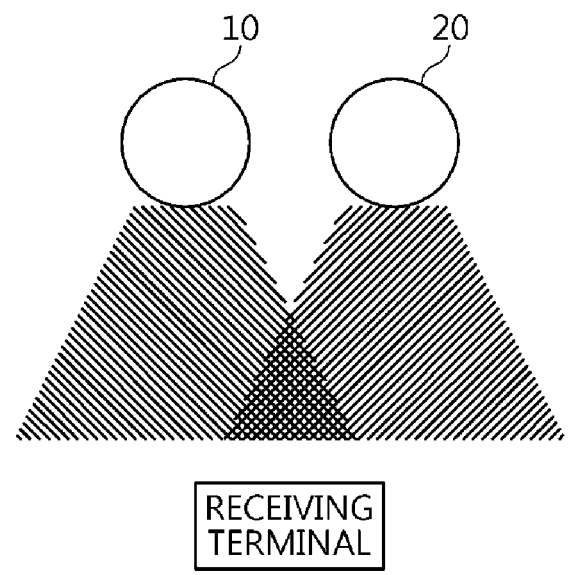
FIG. 2 is a diagram illustrating a method of determining the location a receiving terminal when illumination lights are located close to each other.

However, this method is disadvantageous in that a case where the receiving terminal cannot determine an accurate location may occur because neither of two signals may be received or two signals may be received when the first and second illumination lights 10 and 20 are placed close to each other, as illustrated in FIG. 2, or when a plurality of IDs are simultaneously transferred to the receiving terminal through the reflection of light or the like.

Figure 3:
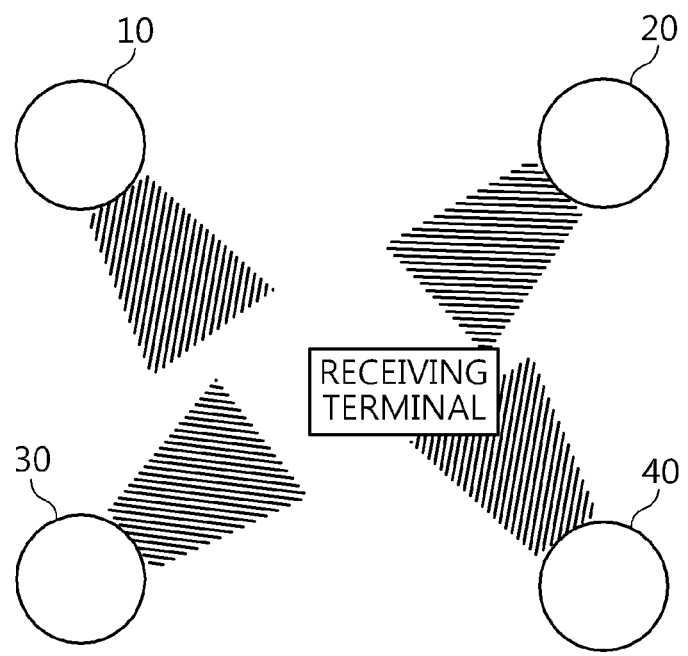
FIG. 3 is a diagram illustrating a method of determining the location a receiving terminal when location IDs are received from a plurality of illumination lights.

When location IDs are received from a plurality of illumination lights 10 to 40, as illustrated in FIG. 3, it may be possible to calculate the location of a receiving terminal by measuring the intensities of power and then applying triangulation to the measured intensities of power.

Next, an apparatus 400 for determining the location of a terminal according to an embodiment of the present invention is described in detail with reference to FIG. 4.

Figure 4:
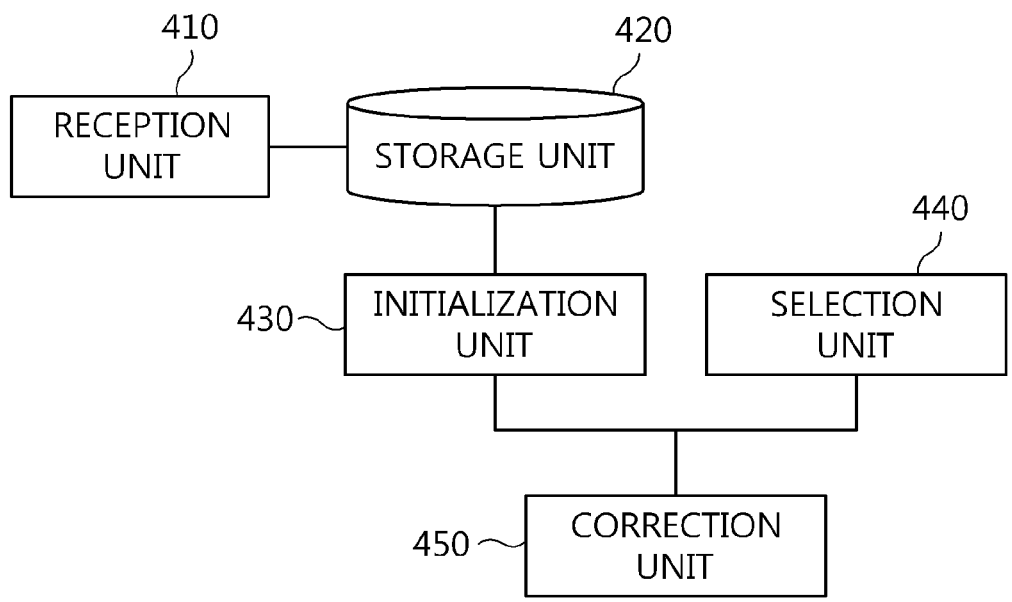
FIG. 4 is a configuration diagram schematically illustrating an apparatus for determining the location of a terminal according to an embodiment of the present invention.
Figure 5:
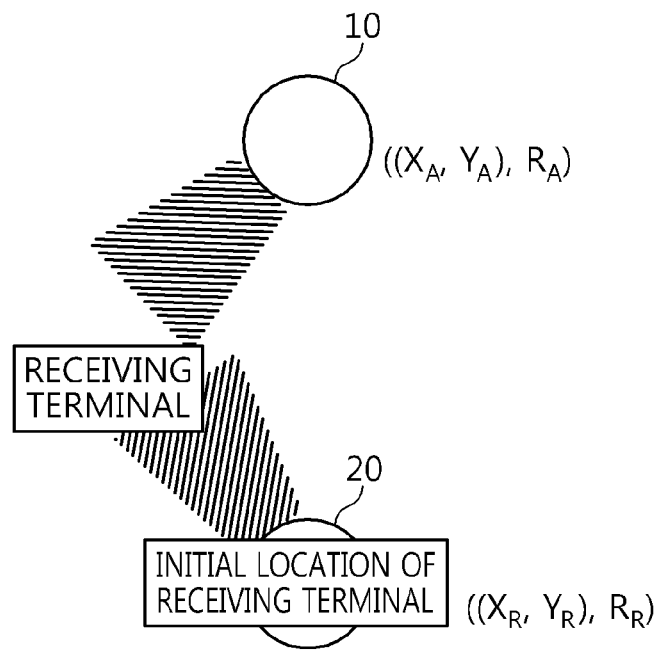
FIGS. 5 and 6 are reference diagrams applied to an apparatus for determining the location of a terminal according to an embodiment of the present embodiment.
Figure 6:
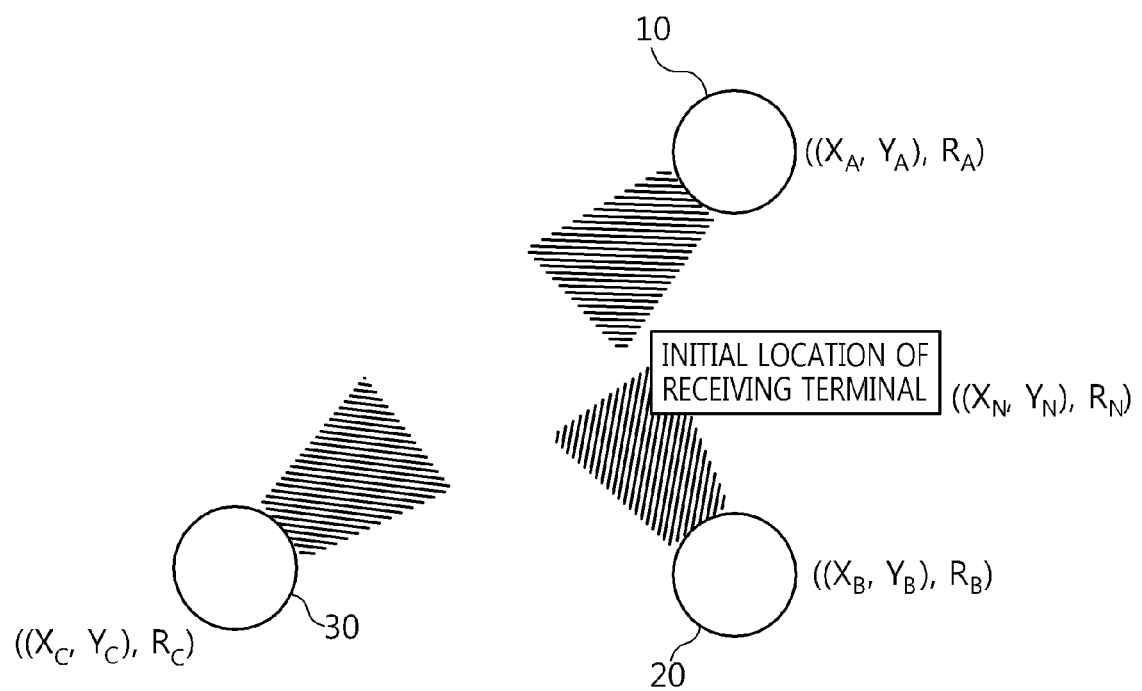

FIG. 4 is a configuration diagram schematically illustrating the apparatus 400 for determining the location of a terminal according to the present embodiment. Furthermore, FIGS. 5 and 6 are reference diagrams applied to the apparatus 400 for determining the location of a terminal according to the present embodiment.

Referring to FIG. 4, the apparatus 400 for determining the location of a terminal includes a reception unit 410, a storage unit 420, an initialization unit 430, a selection unit 440, and a correction unit 450.

The reception unit 410 receives the N location IDs of LED illumination lights during a set time period.

More specifically, the reception unit 410 initializes a timer (not illustrated), and then receives corresponding locations ID from one or more LED illumination lights. In this case, the reception unit 410 receives location IDs during a set time period, and then terminates the timer.

The storage unit 420 stores the location IDs of the one or more LED illumination lights received by the reception unit 410 during the set time period.

The initialization unit 430 initializes the location coordinates of the receiving terminal to the coordinates of an LED illumination light corresponding to the most frequently received one of all the location IDs of the one or more LED illumination lights stored in the storage unit 420.

The selection unit 440 selects the coordinates of an LED illumination light corresponding to the second-most frequently received one of the location IDs of the one or more LED illumination lights stored in the storage unit 420.

The correction unit 450 calculates a corrected location using the coordinates of the LED illumination light and the number of receptions of the corresponding location ID set by the initialization unit 430 and the coordinates of the LED illumination light and the number of receptions of the corresponding location ID selected by the selection unit 440.

For example, when the largest number of location IDs have been received from the second illumination light 20 of FIG. 5, the initialization unit 430 initializes the location coordinates of the receiving terminal to the coordinates of the second illumination light 20. In this case, it is assumed that the coordinates of the second illumination light 20 are $(X_B, Y_B)$ and the number of received location IDs is $R_B$.

When the second largest number of location IDs have been received from the first illumination light 10, the selection unit 440 selects the coordinates of the first illumination light 10. In this case, it is assumed that the coordinates of the first illumination light 10 are $(X_A, Y_A)$ and the number of received location IDs is $R_A$.

The correction unit 450 calculates a corrected location coordinates $(X_N, Y_N)$ using the coordinates $(X_B, Y_B)$ of the LED illumination light set by the initialization unit 430 and the coordinates $(X_A, Y_A)$ of the LED illumination light selected by the selection unit 440 as in Equation 1:

$$X_N = \frac{R_B}{R_B + R_A} \times X_B + \frac{R_A}{R_B + R_A} \times X_A \quad (1)$$

$$Y_N = \frac{R_B}{R_B + R_A} \times Y_B + \frac{R_A}{R_B + R_A} \times Y_A$$

$$R_N = R_B + R_A$$

Thereafter, when the third largest number of location IDs have been received from a third illumination light 30, the correction unit 450 determine the calibrated location of the receiving terminal using the corrected location coordinates $(X_N, Y_N)$ and $R_N$ and the coordinates $(X_C, Y_C)$ of the third illumination light 30 and $R_C$.

As described above, the apparatus 400 for determining the location of a terminal repeatedly corrects the location of a receiving terminal when the receiving terminal is present among various illumination lights, which transmit different pieces of location information, in the case where location determination service is provided using VLC, thereby more accurately determining a location.

Next, a method of determining the location a terminal will be described in detail with reference to FIG. 7.

Figure 7:
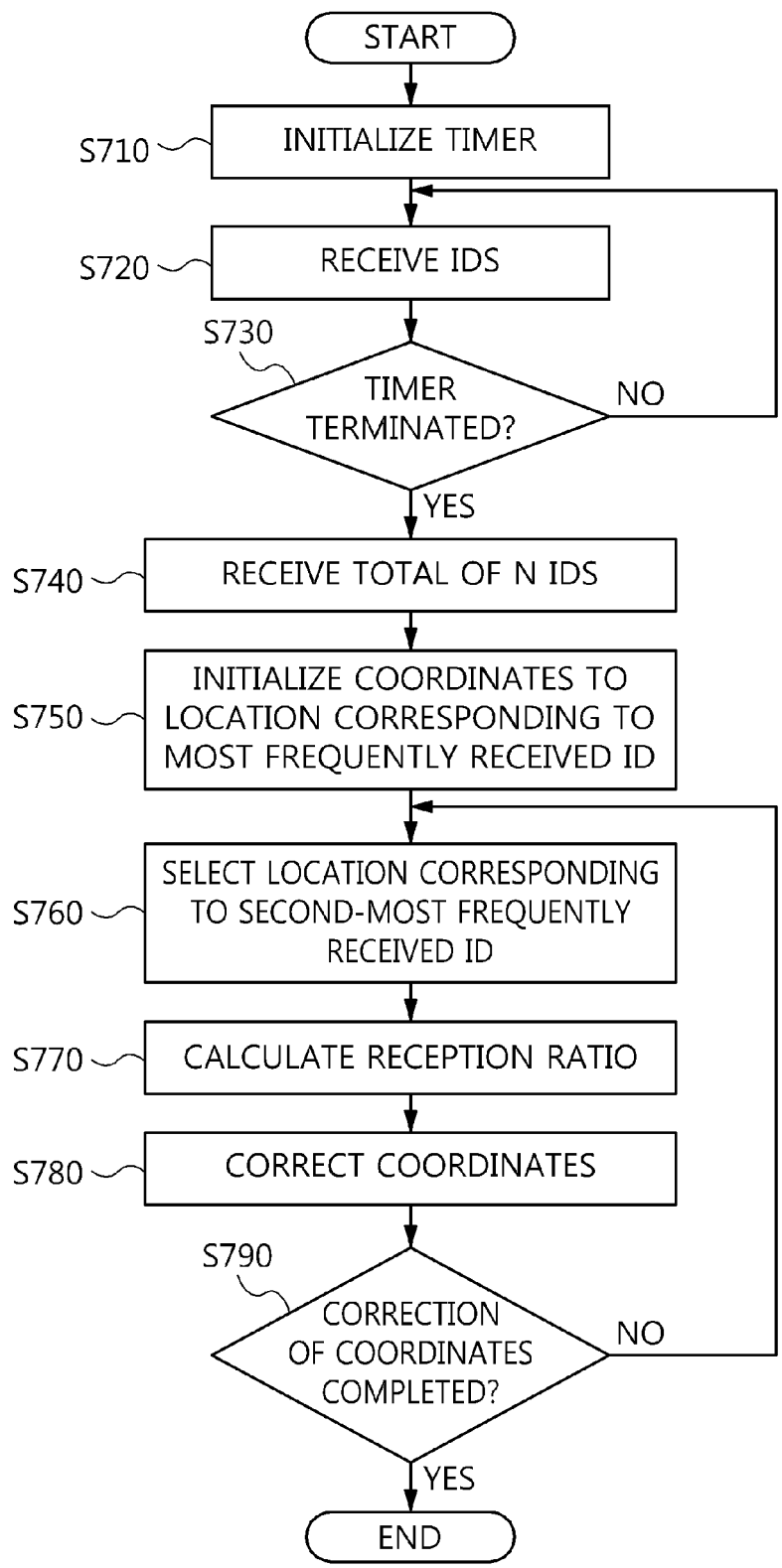
FIG. 7 is a flowchart illustrating a method of determining the location a terminal according to an embodiment of the present invention.

FIG. 7 is a flowchart illustrating a method of determining the location a terminal according to an embodiment of the present invention.

Referring to FIG. 7, the apparatus 400 for determining the location of a terminal initializes the timer (not illustrated) at step S710 prior to determining the location the terminal.

The apparatus 400 for determining the location of a terminal receives corresponding locations ID from one or more LED illumination lights at step S720.

The apparatus 400 for determining the location of a terminal checks whether a set time period has elapsed while receiving the corresponding locations ID from the LED illumination lights at step S730.

At step S740, the apparatus 400 for determining the location of a terminal receives the N location IDs of the LED illumination lights during steps S710 to S730.

At step S750, the apparatus 400 for determining the location of a terminal initializes the location coordinates of a receiving terminal to the coordinates of an LED illumination light corresponding to the most frequently received one of the results received at step S740.

At step S760, the apparatus 400 for determining the location of a terminal selects the coordinates of an LED illumination light corresponding to the second-most frequently received one of the results received at step S740.

At step S770, the apparatus 400 for determining the location of a terminal calculates the reception ratio of reception from the coordinates of the LED illumination light set at step S750 to reception from the coordinates of the LED illumination light selected at step S760.

At S780, the apparatus 400 for determining the location of a terminal corrects the coordinates based on the reception ratio calculated at step S770.

The apparatus 400 for determining the location of a terminal checks whether the correction of the coordinates of all the location IDs has been completed at step S790, and terminates the process if the correction of the coordinates has been completed, and performs step S760 if the correction of the coordinates has not been completed.

In accordance with the present invention, the apparatus and method for determining the location of a terminal can more accurately determine the location of a receiving terminal when the receiving terminal is present among various illumination lights, which transmit different pieces of location information, in the case where location determination service is provided using VLC, thereby more accurately determining a location.

As described above, the optimum embodiments have been disclosed in the drawings and the specification. Although specific terms have been used herein, they have been used merely for the purpose of describing the present invention, but have not been used to restrict their meanings or limit the scope of the present invention set forth in the claims. Accordingly, it will be understood by those having ordinary knowledge in the relevant technical field that various modifications and other equivalent embodiments can be made. Therefore, the true ranges of protection of the present invention should be defined based on the technical spirit of the attached claims.

What is claimed is:

1. A method of determining a location of a terminal, comprising:
    receiving location identifications (IDs) of one or more illumination lights;
    initiating location coordinates of a receiving terminal to coordinates of an illumination light corresponding to a most frequently received location identification (ID);
    selecting coordinates of an illumination light corresponding to a second-most frequently received location ID; and
    calculating a reception ratio of reception from the coordinates of the initiated illumination light to reception from the coordinates of the selected illumination light, and correcting the coordinates of the receiving terminal based on the calculated reception ratio.

2. The method of claim 1, wherein receiving the location IDs comprises:
    initializing a timer;
    receiving corresponding location IDs from one or more illumination lights during a set time period; and
    then terminating the timer.

3. The method of claim 1, further comprising:
selecting coordinates of an illumination light corresponding to a third-most frequently received location ID; and
correcting the coordinates of the receiving terminal based on a reception ratio of reception from the corrected coordinates of the receiving terminal to reception from the coordinates of the illumination light corresponding to the third-most frequently received location ID.

4. An apparatus for determining a location of a terminal, comprising:
a reception unit configured to receive location IDs of one or more illumination lights;
an initiation unit configured to initiate location coordinates of a receiving terminal to coordinates of an illumination light corresponding to a most frequently received location ID;
a selection unit configured to select coordinates of an illumination light corresponding to a second-most frequently received location ID; and
a correction unit configured to calculate a reception ratio of reception from the coordinates of the initiated illumination light to reception from the coordinates of the selected illumination light and then correct the coordinates of the receiving terminal based on the calculated reception ratio.

5. The apparatus of claim 4, wherein the reception unit is further configured to:
initialize a timer;
receive corresponding location IDs from one or more illumination lights during a set time period; and
then terminate the timer.

6. The apparatus of claim 4, wherein the correction unit is further configured to:
select coordinates of an illumination light corresponding to a third-most frequently received location ID; and
correct the coordinates of the receiving terminal based on a reception ratio of reception from the corrected coordinates of the receiving terminal to reception from the coordinates of the illumination light corresponding to the third-most frequently received location ID.

7. The apparatus of claim 4, further comprising:
a storage unit configured to store the location IDs of the illumination lights that are received by the reception unit.

8. A method of determining a location of a terminal, comprising:
receiving location IDs of one or more illumination lights;
initiating location coordinates of a receiving terminal and selecting coordinates of an illumination light, based on frequencies of reception of the received location IDs; and
calculating a reception ratio of reception from the coordinates of the initiated illumination light to reception from the coordinates of the selected illumination light, and correcting the coordinates of the receiving terminal based on the calculated reception ratio.

9. The method of claim 8, wherein initiating the location coordinates of the receiving terminal comprises initiating the location coordinates of the receiving terminal to coordinates of an illumination light corresponding to a most frequently received location ID, and selecting the coordinates of the illumination light comprises selecting coordinates of an illumination light corresponding to a second-most frequently received location ID.

10. The method of claim 8, further comprising:
storing the received location IDs of the illumination lights that are received by the reception unit.

\* \* \* \* \*